(12) United States Patent
Thomas et al.

(10) Patent No.: US 7,126,233 B2
(45) Date of Patent: Oct. 24, 2006

(54) METHODS AND APPARATUSES FOR GENERATING ELECTRICAL POWER IN A ROTATING REFERENCE FRAME

(75) Inventors: Mark Thomas, Cupertino, CA (US); Joel Osias, San Jose, CA (US)

(73) Assignee: SET Industries Corporation, Fremont, CA (US)

( * ) Notice: Subject to any disclaimer, the term of this patent is extended or adjusted under 35 U.S.C. 154(b) by 0 days.

(21) Appl. No.: 10/941,568

(22) Filed: Sep. 14, 2004

(65) Prior Publication Data
US 2005/0057045 A1  Mar. 17, 2005

Related U.S. Application Data

(60) Provisional application No. 60/503,510, filed on Sep. 15, 2003.

(51) Int. Cl.
*H02K 35/02* (2006.01)

(52) U.S. Cl. ..................................... 290/1 R
(58) Field of Classification Search ............... 290/1 R
See application file for complete search history.

(56) References Cited

U.S. PATENT DOCUMENTS

| | | | |
|---|---|---|---|
| 1,643,593 A | 9/1927 | Styer et al. | |
| 2,177,467 A | 4/1939 | Sunderhauf | |
| 2,526,548 A | 10/1950 | Franklin | |
| 3,699,367 A * | 10/1972 | Thomas | 310/69 |
| 3,760,351 A * | 9/1973 | Thomas | 340/443 |
| 4,229,728 A | 10/1980 | Tremba | |
| 4,405,872 A * | 9/1983 | Thomas | 310/75 R |
| 4,429,232 A | 1/1984 | Thomas et al. | |
| 4,430,692 A | 2/1984 | Papadakis | |
| 4,504,761 A * | 3/1985 | Triplett | 310/339 |
| 4,539,496 A | 9/1985 | Thomas et al. | |
| 4,761,577 A | 8/1988 | Thomas et al. | |
| 4,775,919 A | 10/1988 | Pearsall et al. | |
| 5,016,144 A | 5/1991 | DiMaggio | |
| 5,548,274 A | 8/1996 | Anderson et al. | |
| 5,558,426 A | 9/1996 | Cabanatan et al. | |
| 5,650,681 A | 7/1997 | DeLerno | |
| 5,800,035 A | 9/1998 | Aichele | |
| 5,934,882 A * | 8/1999 | Olney et al. | 417/233 |
| 6,030,106 A | 2/2000 | Johnson | |
| 6,220,733 B1 | 4/2001 | Gordon | |
| 6,291,901 B1 * | 9/2001 | Cefo | 290/1 R |
| 6,530,683 B1 | 3/2003 | Ohkohdo et al. | |

(Continued)

FOREIGN PATENT DOCUMENTS

DE    19922570 A1 * 11/2000

(Continued)

*Primary Examiner*—Joseph Waks
(74) *Attorney, Agent, or Firm*—Blakely, Sokoloff, Taylor & Zafman LLP

(57) ABSTRACT

A method and apparatus for generating power in a rotating environment without access to the axis of rotation. A non-center engagement generator is implemented within the rotating reference frame of a vehicle wheel. Further, a method and apparatus detect a potential rollover state and prevent occurrence of a rollover state or eliminate a rollover state once attained.

23 Claims, 8 Drawing Sheets

U.S. PATENT DOCUMENTS

| | | |
|---|---|---|
| 6,565,243 B1 | 5/2003 | Cheung |
| 6,612,726 B1 | 9/2003 | Gloodt et al. |
| 6,641,041 B1 | 11/2003 | Olds et al. |
| 6,776,458 B1 | 8/2004 | Wang |
| 6,789,928 B1 | 9/2004 | Khan |
| 6,809,426 B1 * | 10/2004 | Naar et al. .................. 290/1 R |
| 6,817,743 B1 | 11/2004 | Sharper |
| 2002/0136020 A1 | 9/2002 | Hung |
| 2003/0223243 A1 | 12/2003 | Miller |
| 2004/0037088 A1 | 2/2004 | English et al. |
| 2004/0100100 A1 * | 5/2004 | Wilson |
| 2005/0030755 A1 | 2/2005 | Thomas et al. |
| 2005/0099820 A1 | 5/2005 | Cooper |

FOREIGN PATENT DOCUMENTS

| | | | |
|---|---|---|---|
| DE | 10055882 A1 | * | 5/2002 |
| FR | 2407599 A | * | 6/1979 |
| GB | 2307044 A | * | 5/1977 |
| JP | 2001258234 A | * | 9/2001 |

* cited by examiner

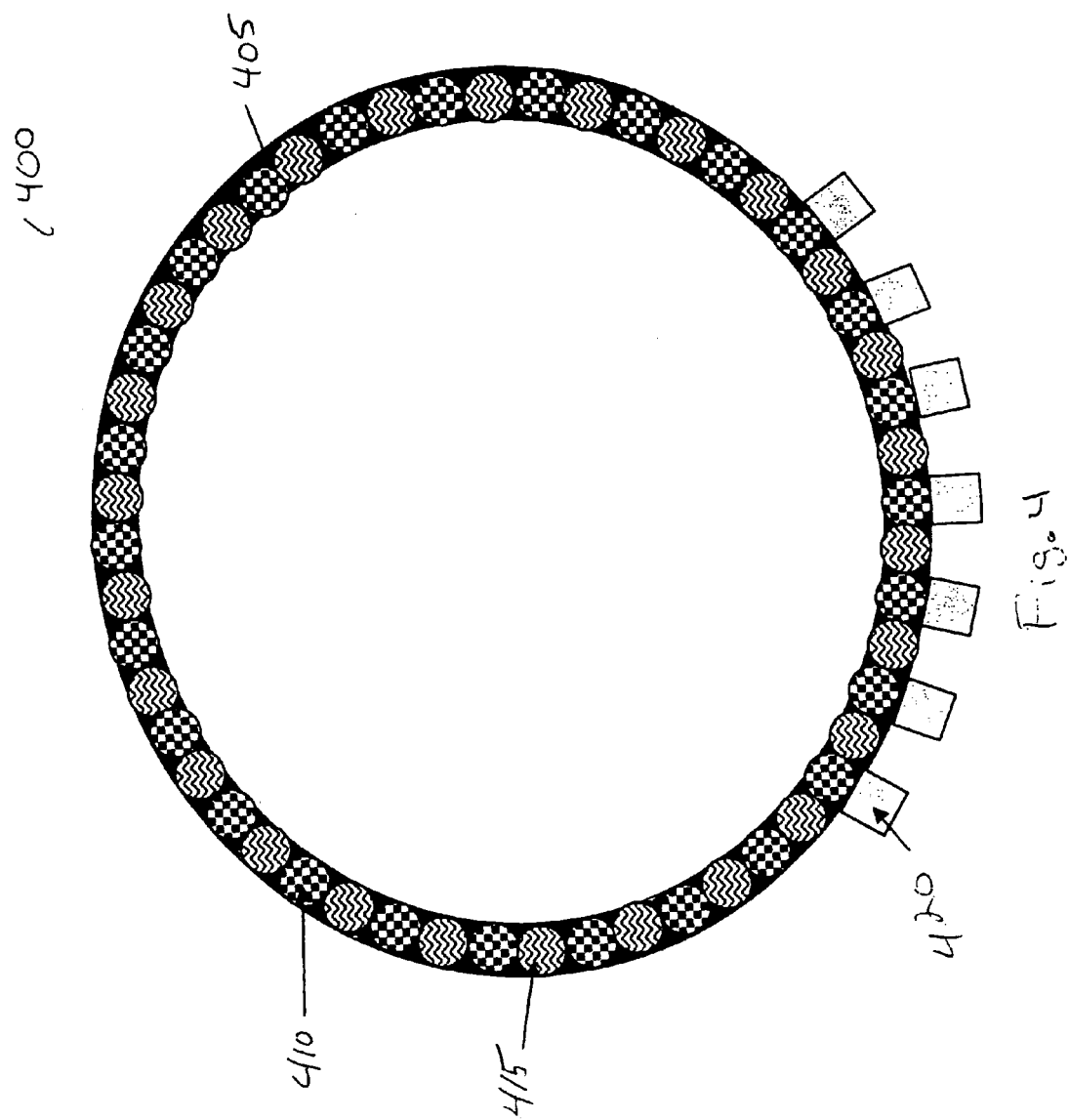

METHODS AND APPARATUSES FOR GENERATING ELECTRICAL POWER IN A ROTATING REFERENCE FRAME

CLAIM OF PRIORITY

This application is related to, and hereby claims the benefit of provisional application No. 60/503,510, which was filed Sep. 15, 2003.

FIELD

Embodiments of the invention relate generally to the field of electric generators and more specifically to wheel-mounted electrical generators.

BACKGROUND

There are several alternatives for providing power to electrical systems implemented within a rotating reference frame (e.g., the rotating reference frame of a wheel). The electrical power may be commutated from a stationary reference frame (e.g., a vehicle), however, this requires multiple different implementations to accommodate the different geometries and configurations of various vehicle and wheel combinations. Batteries provide an alternative for supplying power, but replacing or recharging batteries, even on an infrequent basis, may be undesirable.

A third option is to generate electrical power within the rotating reference frame of the wheel. A number of schemes have been devised to independently generate electrical power on the wheel of a vehicle. An independent source of electrical power on the wheel provides many advantages. For example, emergency lighting or other safety features can be more readily and reliably effected with an independent, on-wheel, power source.

Schemes to realize such a power source have typically taken the form of an inertia-based, on-wheel generator that derives energy from the rotation of the wheel.

Examples of such schemes include the following.

U.S. Pat. No. 4,229,728 to Tremba discloses a generator on a vehicle wheel. The generator is composed of a first member and a second member. The first member is mounted coaxially with the wheel's axis of rotation and contains a permanent magnetic element. The second member contains an inductor and is mounted to the wheel so that is can be rotated proximate to the first member. The second member rotates free of the first member and has a mass center which is displaced from the axis of the first member, resulting in a pendulum or vertical position seeking affect. The difference in angular velocities is used to generate electricity.

U.S. Pat. No. 4,539,496 to Thomas discloses a generator attached to one end of an elongated arm, the other end of which is attached to a rotationally free structure that is coaxial with the axis of the wheel. The rotationally free structure allows the wheel to rotate without causing the elongated arm to rotate. The generator has a drive wheel that attaches to its axis. This drive wheel engages the surface of the wheel. Therefore as the wheel turns the generator axis turns and electrical energy is generated. The generator and additional counterweight supplies a torque, which prevents the elongated arm and attached mechanisms from rotating with the wheel.

U.S. Pat. No. 4,775,919 Pearsall discloses a means of generating power as part of a hubcap lighting system. Two housings are implemented within the hubcap. The first housing contains the armature coils, and is attached to and rotates with the wheel. The second housing contains the magnets, and is attached to the center axis of the hubcap and rotates freely with respect to the first housing. Power is generated by the difference in velocity of the two housings. A counterweight to the second housing is implemented to increase resistance to rotation.

Such schemes are disadvantageous in that access to the wheel's axis of rotation is required. This drawback is addressed in U.S. Pat. No. 4,429,232 to Thomas et al., which discloses a generator characterized by a circular track attached to the relieved circumferential surface of a wheel, a carriage coupled to the track by rotary bearings, a generator supported by the carriage, and a clutch wheel coupling an armature of the generator to the track. The track, which preferably has a T shaped cross section, has a driving surface which causes the clutch wheel to rotate when there is relative motion between the track and the carriage and/or between the carriage and the air within the tire. The generator, then, is not subjected to centrifugal forces, but only to normal gravitational forces.

An additional disadvantage of typical prior art schemes is that they are subject to a rollover state. The rollover state is the condition in which a counterweight of the generator's stator is carried over a critical angle and begins to rotate with the wheel.

This disadvantage is recognized and addressed with some success by U.S. Pat. No. 4,761,577 to Thomas et al., which discloses a generator contained within a wheel-mounted hub. The generator is pivotally supported in arms of a yoke. The yoke and generator have an offset center of gravity, tending to give the yoke and generator a pendulum-like behavior within the housing. During wheel rotation, the generator tends to remain along a gravitational line of force, forcing a small contact wheel, associated with the generator, to turn against the hub.

At high speeds, the generator assembly tends to rotate with the wheel due to electromagnetic torque coupling between the small contact wheel and the hub on which it turns. Such rotation of the generator assembly with the wheel can lead to the rollover state.

To address the situation a current limiter switch is implemented for the generator such that if the axis of the small contact wheel exceeds a specified angle, the switch is activated and the excitation current of the stator ceases. When the stator is not sufficiently excited, the generator is disabled, thus minimizing the friction between the rotor and the stator. In this condition the generator tends to fall toward a gravitational line of force.

This scheme addresses one way of attempting to avoid entering the rollover state when such state is approached gradually (i.e., smooth road surface). In many cases the rollover state is entered suddenly, for example, driving over a pothole in the road may cause a sudden transition to the rollover state. This scheme does not address methods for terminating the rollover state once it has been achieved. Moreover, this scheme, like many prior art schemes requires access to the wheel's axis of rotation.

SUMMARY

Embodiments of the invention provide methods and apparatuses for generating power in a rotating reference frame. Embodiments of the invention effect a power generation scheme without direct access or attachment to the axis of rotation. Embodiments of the invention implement constituent components of a power generation device within the rotating reference frame thus facilitating installation, maintenance and repair of the power generation device.

Various alternative embodiments of the invention, in which the rotating reference frame is a vehicle wheel, do not alter the appearance or function of the wheel/tire assembly.

An additional object of the invention is safe operation of the invention under normal operating conditions and under some extreme operating conditions.

Embodiments of the invention are easy for the manufacturer to produce and sustain in the field. For example, for an embodiment in which the rotating reference frame is a vehicle wheel, the power generation device accommodates a large number of vehicle variations and wheel variations with a much smaller wheel generator product set. Such embodiments may include configurations that provide security measures to prevent theft, enable reliable implementations, and enable implementations that meet with state and federal vehicle codes.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings:

FIG. 4 illustrates a non-center engagement variable slip generator implemented within the rotating reference frame of a wheel in accordance with one embodiment of the invention;

DETAILED DESCRIPTION

Figure 1:
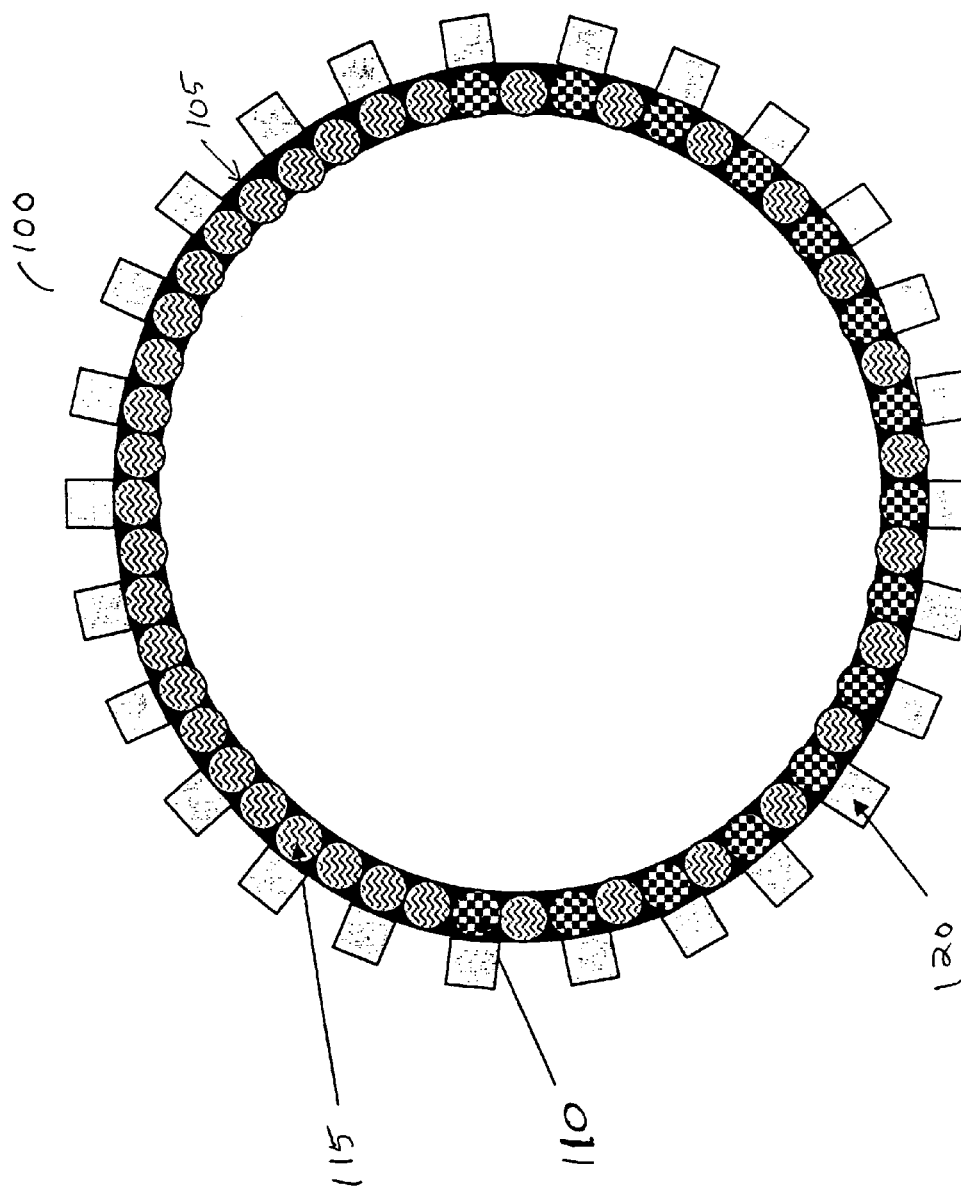
FIG. 1 illustrates a non-center engagement constant slip generator implemented within the rotating reference frame of a wheel in accordance with one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Non-Center Engagement Generator

Overview

In accordance with one embodiment of the invention a generator is implemented within a tube-shaped geometry. For the purpose of this description, a tube is a geometric shape produced by rotating a planar shape around an axis-of-rotation in the plane of the planar shape at a radius which may be fixed or which may vary with the angle of rotation. For example, rotation of a planar shape that is a circle produces a toroid-shaped tube. A hollow tube is produced by two concentric circles of radius R2A and R2B, where R2B>R2A. The thickness of the ring shaped tube is therefore (R2B–R2A).

The magnetic circuit and electrical circuits of the generator are implemented within the tube. The magnetic circuits include two basic types of elements. The first type (type 1 magnetic circuit elements), are attached directly to the rotating reference frame. The second type, (type 2 magnetic circuit elements), are not attached directly to the rotating reference frame, but interface to the rotating reference frame via a slip interface, e.g. bearing, fluids, etc. The flux through the magnetic circuits changes as the relative orientation of type 1 and type 2 magnetic circuit elements change. The electrical circuits include one or more conductive paths that form closed loops around a portion of the magnetic circuit. The changing magnetic flux through the loops induces a voltage. For alternative embodiments of the invention the closed loops are associated with the type 2 elements in a like manner.

For one embodiment of the invention, the generator is implemented within the rotating reference frame of a wheel. As used herein, the term "rotating reference frame of the wheel" includes any surfaces that are rotating at the same rotational frequency as the wheel and around the same axis as the wheel. The rotating reference frame, therefore, includes the wheel, the tire, the rim, the lugs, the lug nuts, the hub, the valve stem, the drum, the hat, the disc, etc. The rotating reference frame further includes attached devices with bearing floating surfaces that allow some portion of the device to rotate at a different rotational frequency than the wheel or in the extreme case not rotate.

For one embodiment of the invention, the tube in which the generator is implemented is mounted to either the inboard or outboard rim of the wheel.

For one embodiment of the invention, the generator is implemented as a constant slip generator. In alternative embodiments the generator is implemented as a variable slip generator.

Constant Slip Generators

For the purposes of this description, "slip" is defined as the percentage difference in rotational frequencies of the type 2 and type 1 magnetic circuit elements.

$$\text{Slip} = 100\% (\omega_{type1} - \omega_{type2})/\omega_{type1}$$

For constant slip (100% slip) generators the slip is establish by gravitational force. That is, although the type 1 magnetic circuit elements exert an electromagnetic force on the type 2 magnetic circuit elements, the electromagnetic force is opposed by an equal or greater gravitational force. Therefore, the type 2 magnetic circuit elements will not rotate and are fixed with respect to the reference frame sourcing the gravitational field.

For one embodiment, the generator is implemented as a number of type 2 magnetic circuit elements disposed within a tube. The type 2 magnetic circuit elements are supported by a system of friction reduction elements (e.g. ball bearings), which allow the type 2 magnetic circuit elements to move relative to the inside of the tube with only a small amount of frictional resistance. The tube is attached to the rotating reference frame such that the axis of the tube (i.e., the axis-of-rotation used to generate the tube from the planar figure as described above) is oriented co-linear with the axis of rotation of the rotating reference frame. For such an embodiment, in which the rotating reference frame is in the presence of a gravitational field and the direction of the gravitational field is not co-linear with the axis of rotation, gravity is employed to fix the movement of the type 2 magnetic circuit elements to the gravitational field source (e.g. Earth). The gravitational force enables the difference in velocity between the type 1 magnetic circuit elements and the type 2 magnetic circuit elements. This difference in velocity results in changes in magnetic flux that are captured that are captured by the loops (coils) of the electrical circuits of the generator, which in turn induces the voltage.

FIG. 1 illustrates a non-center engagement constant slip generator implemented within the rotating reference frame of a wheel in accordance with one embodiment of the invention. Generator 100, shown in FIG. 1, includes a ring-shaped tube 105. For alternative embodiments the tube in which the generator is implemented may be any suitable geometry.

Disposed within the tube 105 are high magnetic permeability bearings (HMP bearings) 110 and low magnetic permeability bearings (LMP bearings) 115. The HMP bearings 110 may be comprised of iron or steel, for example, while the LMP bearings 115 are made of a less dense material. As illustrated in FIG. 1, the upper portion of the tube 105 contains LMP bearings 115 while the bottom portion of the tube 105 contains alternating LMP 115 bearings and HMP bearings 110. Therefore the aggregate weight of the alternating HMP/LMP bearings is greater than the aggregate weight of the LMP bearings. Because the bearings can rotate freely around the tube 105, gravity will cause the bearings to be arranged as shown with the LMP bearings 115 in the upper portion of tube 105 and the alternating HMP/LMP bearings in the lower portion of tube 105.

Coupled to tube 105 are generator rotor sections 120 including a type 1 magnetic circuit element having a permanent magnet with an electrical circuit (coil) coupled thereto. The generator sections 120 are distributed (e.g., uniformly distributed) around the tube 105.

In accordance with one embodiment of the invention, the tube 105 is attached to a wheel (not shown) such that the axis of the tube 105 is co-linear with the axis of rotation of the wheel. Under normal driving conditions the axis of the tube is substantially perpendicular to the gravitational field. The bearings, therefore, do not rotate with the tube 105 due to the shifting center of gravity of the HMP bearings 110.

Figure 2A:
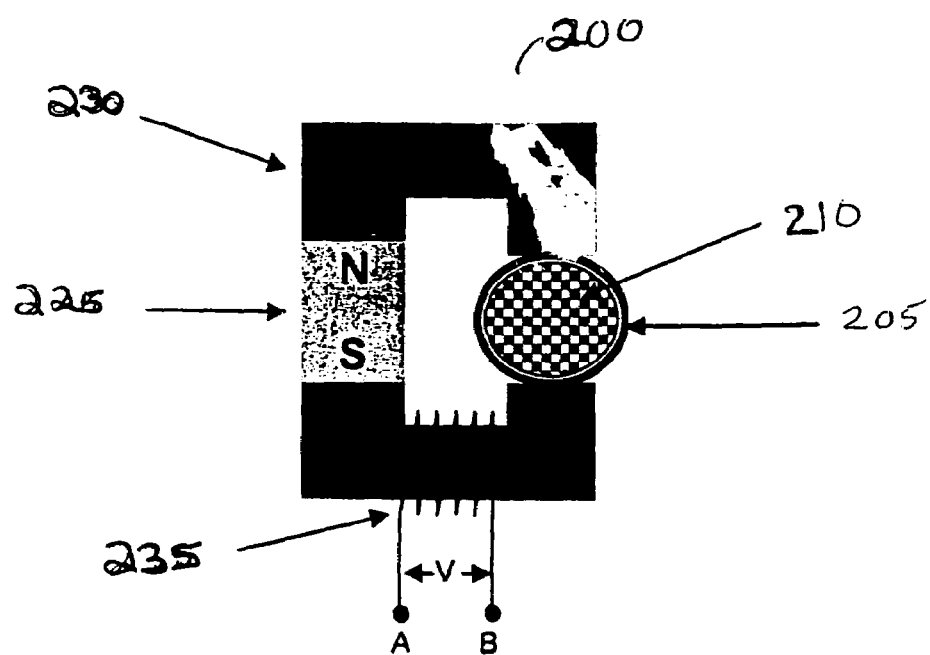
FIGS. 2A and 2B illustrate a cross-sectional view of a non-center engagement constant slip generator in accordance with one embodiment of the invention.
Figure 2B:
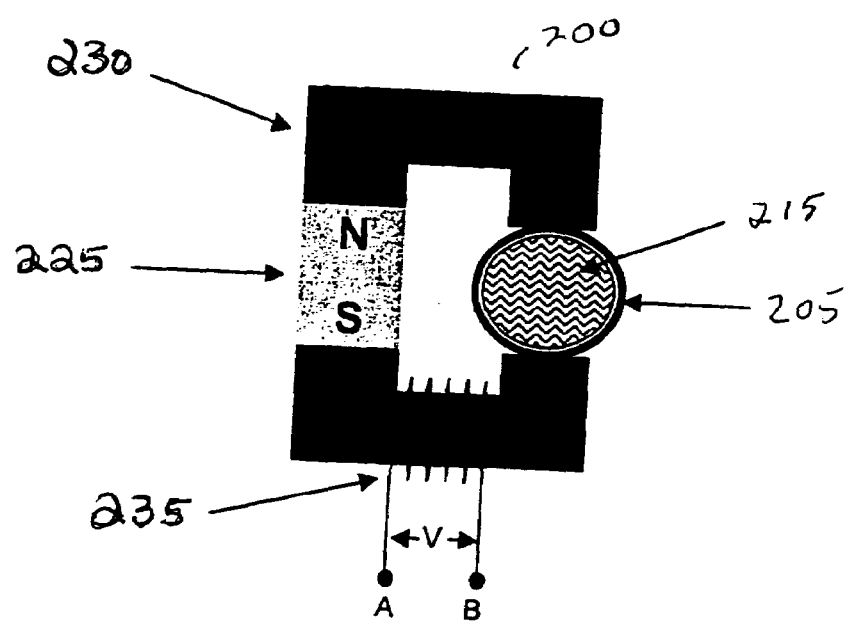

FIGS. 2A and 2B illustrate a cross-sectional view of non-center engagement constant slip generator 100 in accordance with one embodiment of the invention. Magnetic circuit 200, shown in FIG. 2A includes a HMP bearing 210 within a tube 205. The magnetic circuit 200 also includes a magnet 225, a keeper region 230 to reduce demagnification, and a coil 235 coupled to the magnet 225. When positioned between the keeper regions 230 of magnet 225, the HMP bearings 210 complete a magnetic circuit allowing the passage of magnetic flux.

As shown in FIG. 2B, as the LMP bearings 215 are rotated to a position between the keeper regions 230, the magnetic circuit is broken. That is, the magnetic flux of magnetic circuit 200 is modulated by the position and type of the bearing positioned between the keeper regions. As the ball bearings pass through a given generator section, the magnetic flux alternately increases to a maximum shown by the orientation in FIG. 2A and decreases to a minimum as shown by the orientation in FIG. 2B. The changing flux induces a voltage, V, across the terminals of the coil 235 surrounding that particular generator section. The outputs of the individual generator sections may be: transformed, coupled in series, coupled in parallel, etc, or any combination of the aforementioned to produce the desired voltage/current generator capacity.

As described in greater detail below, the amount of electrical power that can be generated depends on the mass of the generator's stator. For an embodiment as described above the generator's stator is approximated by the bearings. Therefore, the amount of electrical power generation depends on the bearing size. However, simply increasing bearing size to meet electrical power generation requirements may not be practical because if the bearing size is increased, the tube diameter, and the generator rotor section (i.e., the type 1 magnetic circuit of the generator rotor section) must be increased proportionally. In accordance with one embodiment of the invention, a generator is implemented as described above using bearings having an extended member. The bearings are contained within a tube having an opening which accommodates the extended member.

Figure 3:
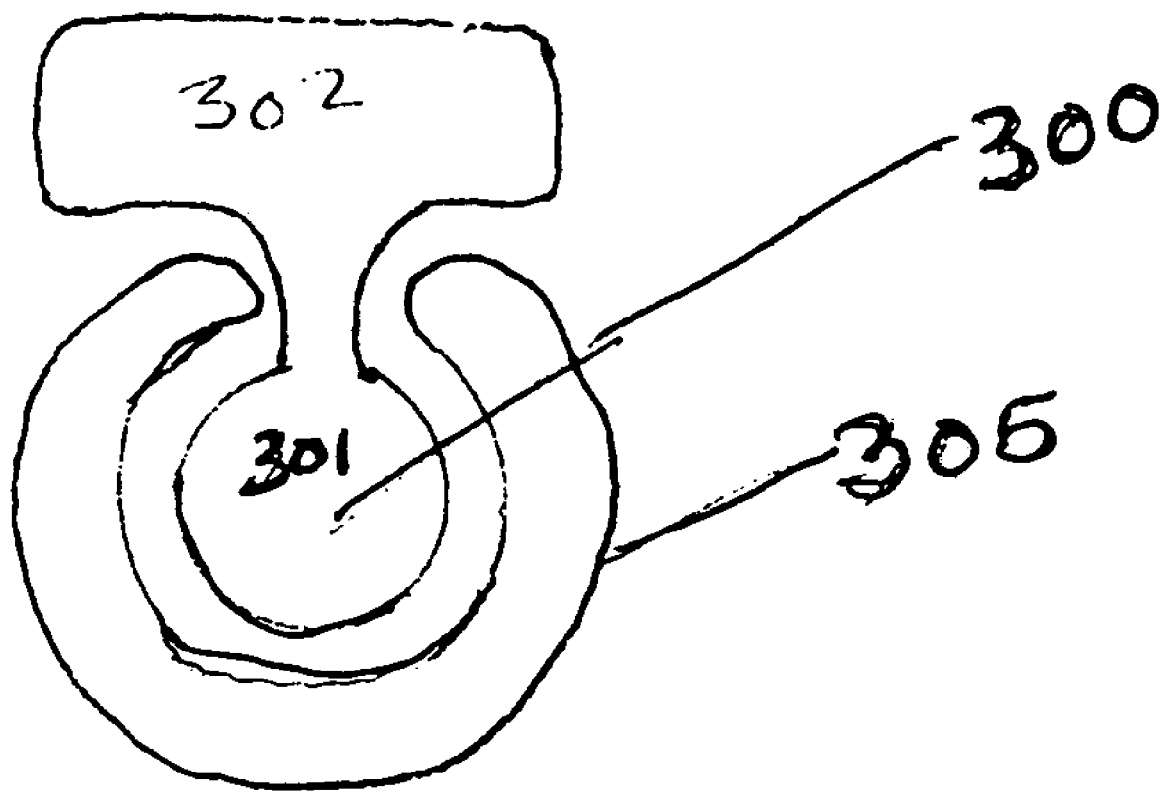
FIG. 3 illustrates an extended member bearing partially enclosed within a tube structure in accordance with one embodiment of the invention.

FIG. 3 illustrates an extended member bearing partially enclosed within a tube structure in accordance with one embodiment of the invention. Bearing 300, shown in FIG. 3, includes a substantially spherical portion 301 and an extended member 302. The bearing 300 is partially contained within tube 305, such that the spherical portion 301 can move freely within tube 305. Tube 305 has an opening to accommodate the extended member 302, which moves along with the spherical portion 301.

The extended member 302 of bearing 300 effectively increases the mass of the generator's stator thereby generating a greater amount of electrical power, without necessitating an increase in the tube diameter or the generator's rotor element.

Variable Slip Flywheel Generator

In accordance with one embodiment of the invention, a variable slip generator is implemented within a rotating reference frame without access to the axis of rotation. The variable slip generator generates electrical power only upon acceleration and deceleration, but is not subject to rollover.

For variable slip flywheel generators, type 1 magnetic circuit elements exert an electromagnetic force on type 2 magnetic circuit elements that is unopposed by any other forces. That is, the frictional force is in the same direction as the electromagnetic force. This means that, over time, the rotational frequency of the type 2 magnetic circuit elements will approach or attain the rotational frequency of the type 1 magnetic circuit elements.

FIG. 4 illustrates a non-center engagement variable slip generator implemented within the rotating reference frame of a wheel in accordance with one embodiment of the invention. Similar to generator 100, described above in reference to FIG. 1, generator 400, shown in FIG. 4, includes a ring shaped tube 405 containing HMP bearings 410 and LMP bearings 415. In contrast to the 100% slip generator, however, all of the bearings of generator 400 are alternating HMP/LMP bearings. That is, the HMP bearings 410 alternate with the LMP bearings 415 around the entire inside circumference of the tube. This means that the center of gravity of the type 2 magnetic circuit elements (the bearings) is coincident with the center of rotation of the wheel. As shown in FIG. 4, this design does not require the generator rotor sections 420, including the type 1 magnetic elements, to be distributed around the entire tube 405.

The generation of electrical power using a variable slip generator in accordance with one embodiment of the invention is described by the following exemplary sequences.

Sequence 1 (Acceleration from Rest)

The wheel is at rest. The angular frequency of the type 1 magnetic circuit elements and the angular frequency of the type 2 magnetic circuit elements are zero. The generator is in a ready state, i.e. "on" and coupled to the electrical load. The wheel is quickly accelerated to an angular frequency of $\omega 0$ without disturbing the type 2 magnetic circuit elements, i.e. $\omega type1=\omega 0$ and $\omega type2=0$. The difference in angular frequencies generates a change in flux that develops coil current in each of the generator rotor sections, which in turn causes an electromotive torque to be exerted on the type 2 magnetic circuit elements. Because the center of gravity of the type 2 magnetic circuit elements is at the center of the rotation there is no gravitational torque to oppose the electromagnetic force. Therefore, ignoring frictional forces, the angular velocity of the type 2 magnetic circuit elements will eventually approach or attain the value $\omega 0$. Electrical power is generated during the time that $\omega type1$ is greater than $\omega type2$.

Sequence 2 (Deceleration to Rest)

The wheel has been running at a constant angular frequency for an extended period of time such that $\omega type1=\omega type2=\omega 0$. The generator is in a ready state, i.e. "on" and coupled to the electrical load. The wheel is quickly decelerated to an angular frequency of 0 without disturbing the type 2 magnetic circuit elements, i.e. $\omega type1=0$ and $\omega type2=\omega 0$. The difference in angular frequencies generates a change in flux that develops coil current in each of the generator rotor sections, which in turn causes an electromotive torque to be exerted on the type 2 magnetic circuit elements. Because the center of gravity of the type 2 magnetic circuit elements is at the center of the rotation there is no gravitational torque to oppose the electromagnetic force. Therefore, ignoring frictional forces, the angular velocity of the type 2 magnetic circuit elements will eventually approach or attain the value 0 Electrical power is generated during the time that $\omega type1$ is greater than $\omega type2$.

Under actual driving conditions the angular frequency of the wheel is never constant. It most driving situations the operator is continually accelerating and decelerating the vehicle for a variety of reasons. In those conditions it is possible to generate small amounts of power in a near continuous manner.

Embodiments of the invention implementing a variable slip generator will typically generate less electrical power than embodiments implementing a 100% slip generator, however such embodiments are inherently more balanced and therefore do not require any apparatus to prevent a rollover state or terminate a rollover state once attained.

ROLLOVER PREVENTION/TERMINATION

For those embodiments of the invention implementing a generator subject to a rollover state, as well as for prior art schemes subject to a rollover state, various embodiments of the invention provide methods and apparatuses to prevent a rollover state or terminate a rollover state once attained. Embodiments of the invention provide methods and apparatuses that control and limit the position of the type 2 magnetic circuit elements under various operating conditions and abnormal operating conditions.

FIGS. 5A–5D illustrate the shifting center of gravity (CG) of a generator's stator under various operating conditions in accordance with one embodiment of the invention. A polar set of coordinates is used to identify positions of element(s) of the wheel and the generator. The CG of the type 2 magnetic elements (e.g., bearings) is designed to be off the center of rotation of the wheel at radius Rcg. For example, in reference to generator 100 of FIG. 1, the LMP bearings 115 are lighter than the HMP bearings 110.

Figure 5B:
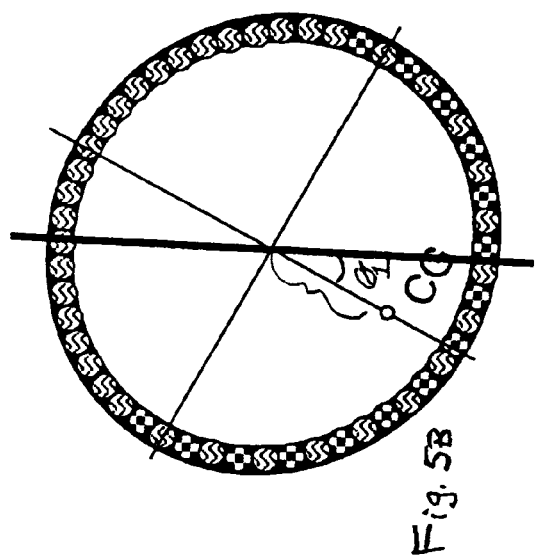
FIGS. 5A–5D illustrate the shifting center of gravity (CG) of a generator's stator under various operating conditions in accordance with one embodiment of the invention.
Figure 5D:
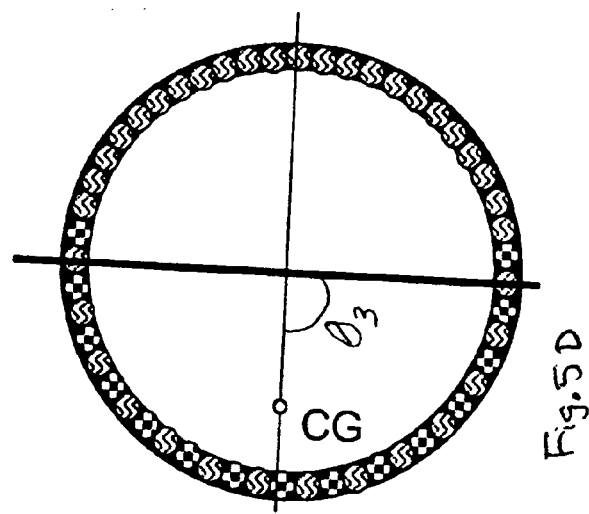
Figure 5A:
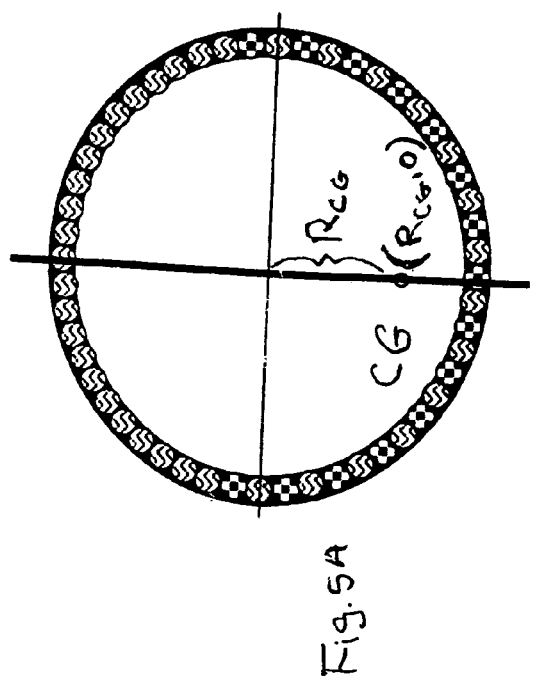

FIG. 5A illustrates a system at rest (i.e., $\omega=0$ and Icoil=0). As shown in FIG. 5A, when the system (e.g., vehicle wheel) is at rest the CG is positioned at r=Rcg and $\theta=0$. This position is represented as the polar coordinate pair (Rcg,0) where the first number is the radius and the second number is the angle (note that the angle is defined such that 0 degrees is a vector directed perpendicular to the ground). A positive angle is defined to be in the clockwise direction relative to the 0 degree position.

FIG. 5B illustrates a system in motion without generator load, (i.e., $\omega=\omega 1$ and Icoil=0). The CG is positioned at (Rcg, $\theta 1$). For well designed systems $\theta 1$ should be small (no more than approximately 25°).

Figure 5C:
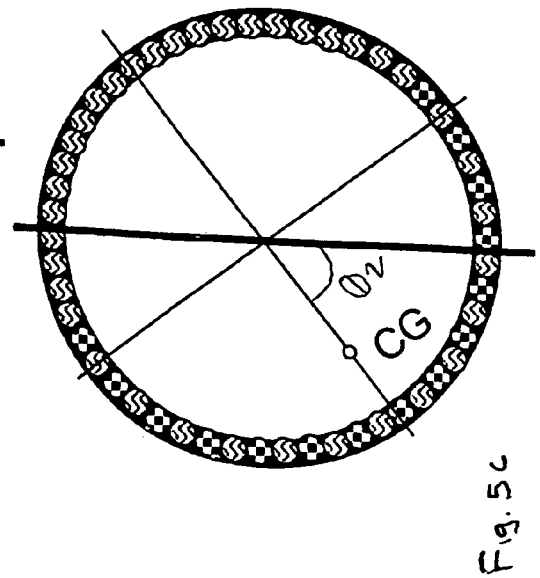

FIG. 5C illustrates a system in motion with a nominal generator load, (i.e., $\omega=\omega 1$ and Icoil=Inominal). The CG is positioned at (Rcg, $\theta 2$), where $\theta 2>\theta 1$. The power, $Pa(\omega,\theta)$, available for conversion to electrical power is the quantity $M*Rcg*g*\sin\theta 2*\omega 1$. Where M is the total mass of the type 2 magnetic circuit elements and g is the gravitational force (e.g., earth's gravitational force). For example, for a type 2 element aggregate mass of 225 g, a CG at distance 10 cm, angle $\theta 2$ of 45°, and $\omega 1$ of 58 rad/sec., the available power is $0.225*(0.1)*9.8*0.785*58$=approximately 9 watts.

FIG. 5D illustrates a system in motion with maximum generator load (i.e., $\omega=\omega 2$ and Icoil=Imaxpwr). The center of gravity is positioned at (Rcg, 90⁻), where 90− refers limit of the quantity $(90-\Delta\theta)$ as $\Delta\theta$ approaches zero. The power available for conversion to electrical power is the quantity $M*Rcg*g*\omega 2$. If the power generation is not limited then at $\omega>\omega 2$ the electromotive force will exceed the gravitational force and the type 2 magnetic circuit elements will start to rotate. Once the type 2 magnetic circuit elements begin to rotate they will continue to accelerate by virtue of the electromotive force versus gravitational force mismatch until the angular frequency of rotation of the type 2 magnetic circuit elements matches the tube's angular frequency of rotation. This undesirable state is defined as the rollover state, i.e. where the type 2 magnetic circuit elements begin to transition to the zero slip state (state in which the type 2 magnetic circuit elements are rotating at the same frequency at the type 1 magnetic circuit elements). The transition to this state is accelerated by the frictional coupling force generated by the clutching effect of the bearings against the tube caused by centrifugal force. Since the type 2 magnetic circuit elements by definition have a CG that is off center, the rotation of these elements will cause an imbalance in the rotation of the wheel, which could cause vibrations and vehicle handling problems.

It is therefore important to control the system to avoid the rollover state. This can be accomplished in accordance with various embodiments of the invention.

Figure 6:
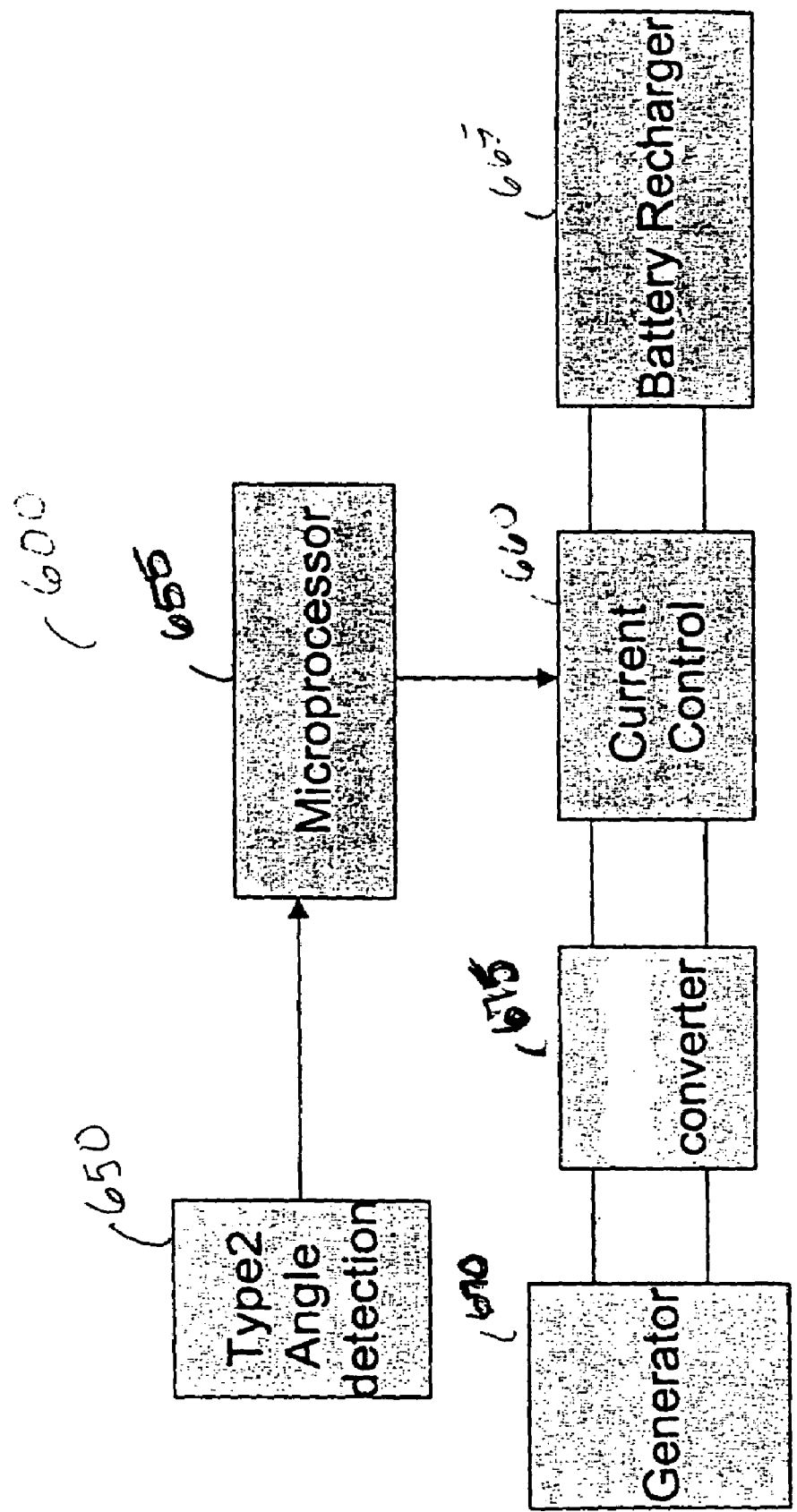
FIG. 6 illustrates a system for preventing a generator from entering a rollover state or terminating a rollover state once attained in accordance with one embodiment of the invention.

FIG. 6 illustrates a system for preventing a generator from entering a rollover state or terminating a rollover state once attained in accordance with one embodiment of the invention. System 600, shown in FIG. 6 includes a stator CG angle detection unit 650 is coupled to a processor 655. When the stator CG angle detection unit 650 detects an angle greater than a specified value (e.g., 45°) the processor 655 signals the current control 660 to limit charging current to the rechargeable batteries 665. As the current from the generator 670 is reduced the gravitational force on the generator's stator will exceed the electromotive force and the angle θ, will be reduced to, or below, a desired maximum value (e.g., θmax<<90 degrees). As shown in FIG. 6, system 600 also includes a converter 675, which may be an AC-to-DC converted or a DC-to-DC converter depending upon the generator and the battery recharger. For alternative embodiments, a converter may not be required depending on coil interconnect.

The angle detector can be implemented in a number of ways. One method is a separate small bearing trace that establishes a stationary reference frame via an off-center CG. Since the bearing trace is not under a generator load it will not vary substantially with speed or torque conditions. Then, for a given generator section, the number of changes of flux relative to this constant point are counted. This count can be translated into the number of high permeability bearings passed after passing θ=0 degrees which can be used to determine the location of the CG of the type 2 magnetic circuit elements.

For an alternative embodiment, limiting conditions are established by measuring θ vs angular velocity and current. This information is then loaded into memory at the time of manufacture and the processor controls the system to maintain desired operating margin.

This method is sufficient to prevent rollover in the case that the vehicle is traveling on a smooth road, however in the case that the road is uneven and has potholes or bumps then this method may not be sufficient.

Figure 7:
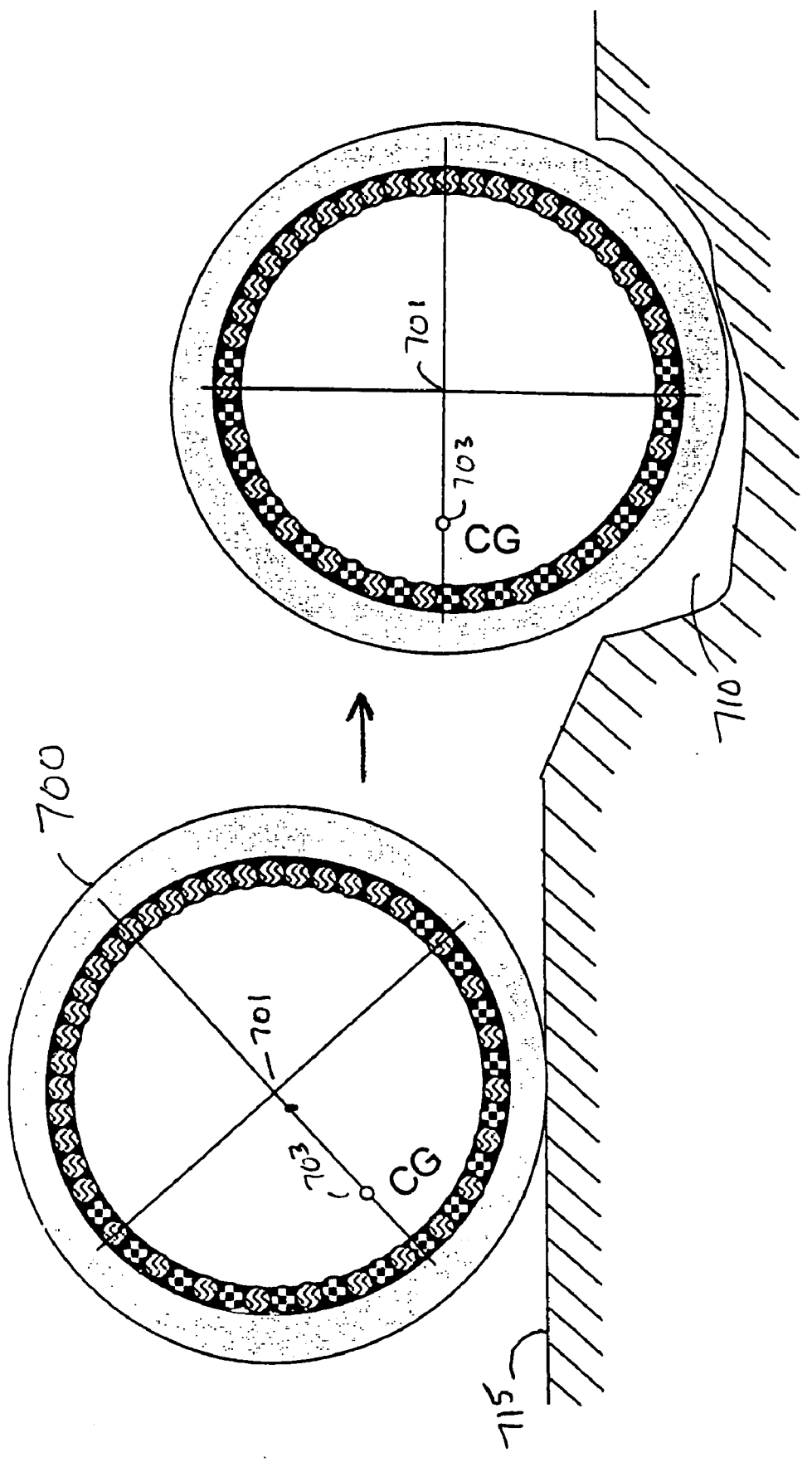
FIG. 7 illustrates how extreme road conditions can cause a generator stator implemented within the rotating reference frame of a vehicle wheel to enter a rollover state in accordance with one embodiment of the invention.

FIG. 7 illustrates how extreme road conditions can cause a generator stator implemented within the rotating reference frame of a vehicle wheel to enter a rollover state in accordance with one embodiment of the invention. As shown in FIG. 7, the wheel 700 entered a significant (relative to the diameter of the wheel) pothole 710. As the wheel 700 drops into the pothole 710, the center of the wheel 701 drops however the type 2 magnetic circuit elements CG 703 does not change by the same amount because components of the translating force that are perpendicular to the radius of rotation are not substantially transferred. If the ball bearing friction is low then the height of the CG above the undisturbed road surface 715 does not change significantly. Such an event can cause the stator to approach or enter the rollover state.

In accordance with one embodiment of the invention an apparatus is used to detect the onset of the rollover state or potential rollover state and control the generator torque to minimize the probability of the rollover state occurring.

One method of controlling the torque to avoid the rollover state is to reduce the coil current if a potential rollover state is detected. Detecting a potential rollover state or an actual rollover state can be done in a number of ways. For example, a position sensitive switch (e.g., a mercury switch) can be used to detect when θ approaches rollover. For an alternative embodiment of the invention, accelerometers on the rotating ring can be used to determine when a strong enough shock is detected that might induce rollover. For another alternative embodiment of the invention, a sensor implemented on the tube could measure radial pressure on the tube to detect a rollover state.

For one embodiment of the invention, potential or actual rollover is addressed by transitioning the generator to a motor. That is, the onboard battery that is normally charged by the generator is used to source a current through the coil in the opposite direction to cause the generator to act as a motor. Referring again to FIG. 6, the current control 660 reverses the current direction so that the battery power is used to drive the generator thus transitioning the generator to a motor. This will exert a torque on the type 2 magnetic circuit elements in the opposite direction, forcing θ to decrease. Even in the case that a rollover state is initiated this method may be used to stop the rotation. Though some of the battery reserve will be depleted by this action this condition will only occur infrequently and therefore should not significantly effect the charge cycle of the batteries.

Figure 8:
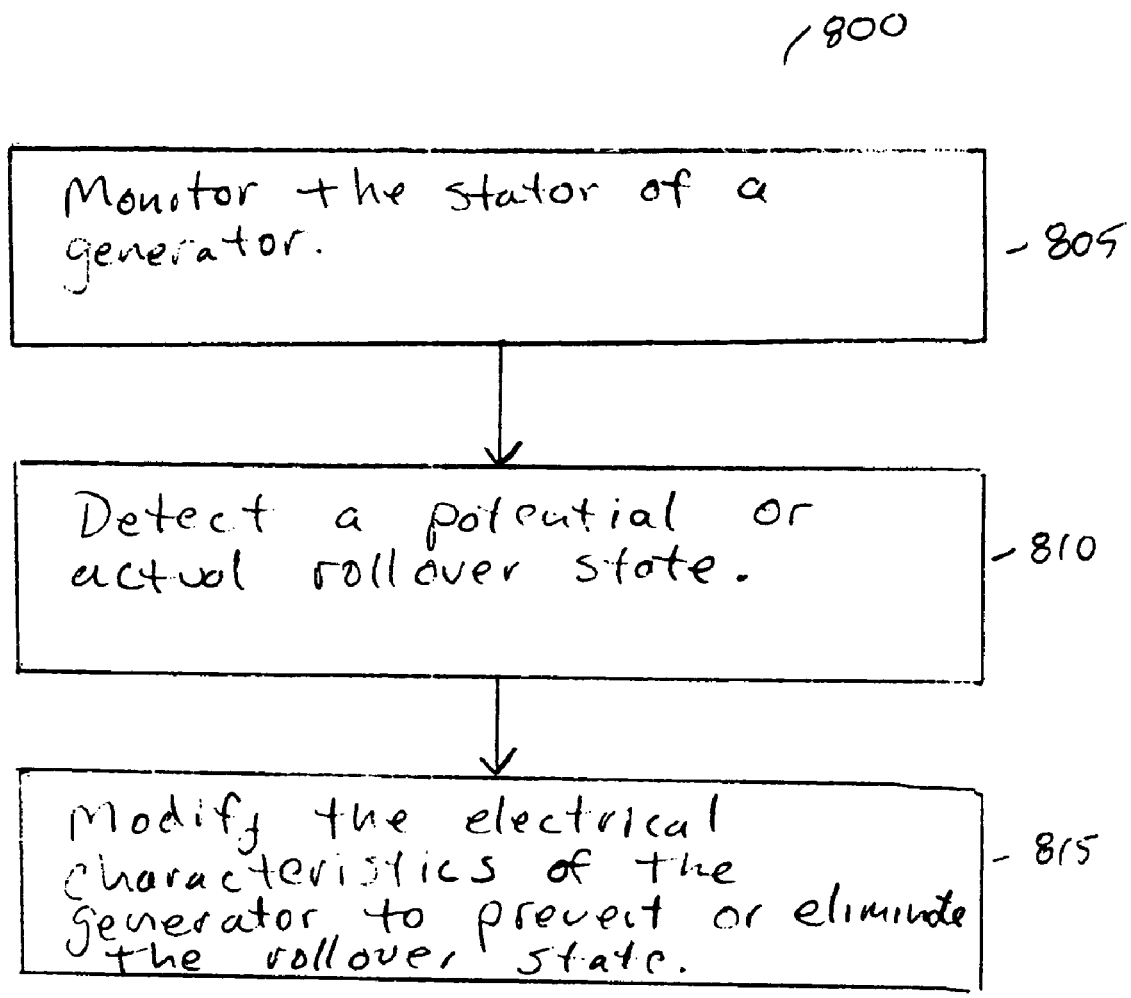
FIG. 8 illustrates a process in which a potential or actual rollover state is determined and addressed in accordance with one embodiment of the invention.

FIG. 8 illustrates a process in which a potential or actual rollover state is determined and addressed in accordance with one embodiment of the invention. Process 800, shown in FIG. 8 begins at operation 805 in which the stator of a generator is monitored. As described above, an acceptable maximum stator angle may be determined by a variety of factors including power requirements, road conditions, and acceptable rollover frequency.

At operation 810 a potential or actual rollover state is detected.

At operation 815 the electrical characteristics of the generator are modified to prevent a potential rollover state or eliminate an actual rollover state as discussed above. For one embodiment of the invention, the generator is transitioned to a motor as described above.

GENERAL MATTERS

Embodiments of the invention provide a non-center engagement generator that includes magnetic circuit elements that move freely in relation to the rotating reference frame in combination with magnetic circuit elements that are coupled to the rotating reference frame.

Various alternative embodiments are possible to implement such a generator. For example, as described in reference to FIG. 1, a number of such elements are contained within a tube and are of two types (i.e., HMP bearings and LMP bearings). In general, an embodiment of the invention could be implemented that includes N bearings divided into I types (where I is less than or equal to N).

Further, there are various ways to configure magnetic circuit elements to generate electrical power in accordance with alternative embodiments of the invention. Such configurations will be apparent to one skilled in the art. For example, although the embodiment described above in reference to FIG. 1 includes multiple discrete freely moving magnetic elements, it is possible to replace such elements with a single, or multiple freely movable structures. The structures supported by a friction reduction system (e.g., ball bearing traces) and having areas of high magnetic permeability and areas of low magnetic permeability. Additionally, implementations may be effected having components of alternating high/low magnetic permeability that are supported by bearings either embedded in the components themselves, or embedded in the tube.

Moreover, there are alternative embodiments for preventing or eliminating a rollover state. Embodiments of the invention have been described above that prevent or eliminate a rollover state through use of a current control to modify the electrical characteristics of the generator's stator. Alternative embodiments are possible which provide mechanical means for automatically changing the CG of the generator's stator in response to a potential or actual rollover state. For example, a generator stator may include a number of independent weighted pendulums. As the stator moves in a desired fashion the weighted pendulums move in concert. However, in a potential or actual rollover state, the independent pendulums are repositioned automatically, to a symmetrical configuration, due to the centrifugal force of rotation. The symmetrical configuration has a CG that is coincident with the CG of the wheel, thus reducing the clutching action on the bearing thereby preventing or eliminating the rollover state.

An embodiment of the invention has been described as a process having various operations. Such operations are exemplary and may be described in their most basic form, but operations can be added to or deleted from the process without departing from the basic scope of the invention in accordance with various embodiments. For example, process 800, described above in reference to FIG. 8, may include additional operations in which The operations of various embodiments of the invention may be effected by hardware or firmware components or may be embodied in machine-executable instructions. An embodiment of the invention may be provided as a computer program product that may include a machine-accessible medium having stored thereon instructions, which may be used to program a computer (or other electronic devices) to perform a process according to the invention as described above.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals, etc.); etc.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   a generator implemented in a rotating reference frame;
   a battery for storing electrical power generated by the generator; and
   a rollover state detection means to detect a potential or actual rollover state of a stator of the generator.

2. The apparatus of claim 1 further comprising:
   a current control means coupling the generator to the battery to transition the generator to a motor upon detection of a potential or actual rollover state.

3. The apparatus of claim 2 wherein the rotating reference frame is the rotating reference frame of a vehicle wheel.

4. The apparatus of claim 2 wherein the stator is rotatably coupled to an axis of rotation of the rotating reference frame.

5. The apparatus of claim 2 wherein detecting a potential or actual rollover state of a stator includes determining that a stator angle is above a specified value.

6. An assembly comprising:
   a wheel having a rotating reference frame;
   an electrical system implemented within the rotating reference frame; and
   a generator implemented within the rotating reference frame to supply electrical power to the electrical system such that the generator does not access an axis of rotation of the rotating reference frame, the generator comprising:
   one or more magnetic circuits, each magnetic circuit having elements attached to the rotating reference frame, wherein the elements are implemented as one or more freely moving members each having areas of high magnetic permeability and areas of low magnetic permeability, and a plurality of bearings interfaced to the rotating reference frame using a slip interface such that upon rotation of the rotating reference frame, a change in a position of the elements with respect to a position of the bearings causes a change in a magnetic flux through the magnetic circuit; and
   one or more electrical circuits having one or more conductor paths that form at least one closed loop around a portion of the magnetic circuit.

7. The assembly of claim 6 wherein the plurality of bearings are contained within a ring-shaped tube, the tube attached to the rotating reference frame, and at least a portion of the bearings are alternating high magnetic permeability bearings and low magnetic permeability bearings.

8. The assembly of claim 7 wherein each of the bearings has an extended member portion extending through an opening in the ring-shaped tube.

9. The assembly of claim 6 wherein the electrical system is a wheel illumination system having one or more strobing light source assemblies positioned within the rotating reference frame of the wheel, such that a sufficient amount of light from the light source assemblies is directed toward a surface of the wheel so that an amount of light reflected from the surface of the wheel is greater than an amount of light from the light source assemblies directed away from the surface of the wheel.

10. An apparatus comprising:
    a rotating reference frame of a vehicle wheel having an axis of rotation; and
    a constant slip generator implemented within the rotating reference frame, the generator not accessing the axis of rotation wherein the generator comprises:

one or more magnetic circuits, each magnetic circuit having first elements attached to the rotating reference frame and second elements interfaced to the rotating reference frame using a slip interface such that upon rotation of the rotating reference frame, a change in a position of the first elements with respect to a position of the second elements causes a change in a magnetic flux through the magnetic circuit; and one or more electrical circuits having one or more conductor paths that form at least one closed loop around a portion of the magnetic circuit.

11. The apparatus of claim 10 wherein the second elements comprise a plurality of bearings contained within a ring-shaped tube, the tube attached to the rotating reference frame.

12. The apparatus of claim 11 wherein the bearings are alternating high magnetic permeability bearings and low magnetic permeability bearings.

13. The apparatus of claim 11 wherein a portion of the ring-shaped tube contains a set of alternating high magnetic permeability bearings and low magnetic permeability bearings and the remainder of the ring-shaped tube contains low magnetic permeability bearings, the set of alternating high magnetic permeability bearings and low magnetic permeability bearings effecting a stator of the slip generator.

14. The apparatus of claim 11 wherein each of the bearings has an extended member portion extending through an opening in the ring-shaped tube.

15. The apparatus of claim 10 wherein the second elements are implemented as one or more freely moving members each having areas of high magnetic permeability and areas of low magnetic permeability.

16. The apparatus of claim 10 further comprising:
an angle detection mechanism to detect an angle of a stator of the slip generator; and
a current control mechanism to modify the electrical characteristics of the generator if a detected angle is greater than a specified value.

17. The apparatus of claim 10 further comprising:
a rollover state detection means to detect a potential or actual rollover state of a stator of the slip generator; and
a current control mechanism to transition the generator to a motor if a potential or actual rollover state is detected.

18. An apparatus comprising:
a rotating reference frame of a vehicle wheel having an axis of rotation; and
a variable slip generator implemented within the rotating reference frame, the generator not accessing the axis of rotation wherein the generator comprises:
one or more magnetic circuits, each magnetic circuit having first elements attached to the rotating reference frame and second elements having a center of gravity that is coincident with the axis of rotation of the reference frame interfaced to the rotating reference frame using a slip interface such that upon rotation of the rotating reference frame, a change in a position of the first elements with respect to a position of the second elements causes a change in a magnetic flux through the magnetic circuit; and
one or more electrical circuits having one or more conductor paths that form at least one closed loop around a portion of the magnetic circuit.

19. The apparatus of claim 18 wherein the second elements comprise a plurality of bearings contained within a ring-shaped tube, the tube attached to the rotating reference frame.

20. The apparatus of claim 19 wherein the bearings are alternating high magnetic permeability bearings and low magnetic permeability bearings.

21. The apparatus of claim 19 wherein a portion of the ring-shaped tube contains a set of alternating high magnetic permeability bearings and low magnetic permeability bearings and the remainder of the ring-shaped tube contains low magnetic permeability bearings, the set of alternating high magnetic permeability bearings and low magnetic permeability bearings effecting a stator of the slip generator.

22. The apparatus of claim 19 wherein each of the bearings has an extended member portion extending through an opening in the ring-shaped tube.

23. The apparatus of claim 18 wherein the second elements are implemented as one or more freely moving members each having areas of high magnetic permeability and areas of low magnetic permeability.

* * * * *